US011932469B2

(12) United States Patent
Concari

(10) Patent No.: US 11,932,469 B2
(45) Date of Patent: Mar. 19, 2024

(54) DISPENSING SYSTEM CAP AND CAP SYSTEM

(71) Applicant: Gabriel E. Concari, Eldersburg, MD (US)

(72) Inventor: Gabriel E. Concari, Eldersburg, MD (US)

( * ) Notice: Subject to any disclaimer, the term of this patent is extended or adjusted under 35 U.S.C. 154(b) by 304 days.

(21) Appl. No.: 17/137,943

(22) Filed: Dec. 30, 2020

(65) Prior Publication Data

US 2021/0206546 A1 Jul. 8, 2021

Related U.S. Application Data

(60) Provisional application No. 62/957,033, filed on Jan. 3, 2020.

(51) Int. Cl.
*B65D 51/24* (2006.01)
*A61J 1/14* (2023.01)
*A61J 7/04* (2006.01)

(52) U.S. Cl.
CPC .......... *B65D 51/245* (2013.01); *A61J 1/1418* (2015.05); *A61J 7/0481* (2013.01)

(58) Field of Classification Search
CPC ..... B65D 51/245; A61J 1/1418; A61J 7/0481; A61J 7/04; G09F 11/23
See application file for complete search history.

(56) References Cited

U.S. PATENT DOCUMENTS

| | | | | |
|---|---|---|---|---|
| 3,921,806 A * | 11/1975 | Wawracz | A61J 7/04 206/533 |
| 5,449,078 A | 9/1995 | Akers | |
| 5,662,224 A * | 9/1997 | Nogues | A61J 7/04 215/230 |
| 5,938,055 A | 8/1999 | Philips | |
| 7,661,384 B2 | 2/2010 | Mataya | |
| 7,878,350 B2 | 2/2011 | Ramoundos | |
| 2012/0160863 A1* | 6/2012 | Thompson | B65D 50/046 221/8 |
| 2016/0125771 A1* | 5/2016 | Nazginov | G09F 11/23 116/308 |
| 2018/0318174 A1* | 11/2018 | Gosselin | A61J 7/04 |

* cited by examiner

*Primary Examiner* — Vishal Pancholi
*Assistant Examiner* — Robert K Nichols, II
(74) *Attorney, Agent, or Firm* — Butzel Long

(57) ABSTRACT

A dispensing system cap is provided that includes a main cap body and a rotatable dial coupled to the main cap body that includes time-of-day indicators and day-of-week indicators to allow a user to indicate the last time that a dose was taken or the next time that a dose is due to be taken. The rotatable dial may include one or more stops, each corresponding to a combination a day indicator and a time-of-day indicator.

18 Claims, 12 Drawing Sheets

DISPENSING SYSTEM CAP AND CAP SYSTEM

CROSS-REFERENCE TO RELATED APPLICATIONS

This application claims priority to U.S. Provisional Patent Application No. 62/957,033 filed Jan. 3, 2020, the disclosure of which is incorporated by reference in its entirety for all purposes.

BACKGROUND

Medications, vitamins, supplements, and the like are often provided in standardized medicine bottles. The standard medicine bottle includes a vial body, typically made of plastic, and a cap that screws or snaps on to the body.

SUMMARY

Embodiments disclosed herein provide dispensing system cap and cap systems that allow a user to indicate when a dosage was last taken or should be taken.

DETAILED DESCRIPTION

Conventional medicine bottles typically do not provide any mechanism to aid users in determining when a medication was last taken or should next be taken. Such a feature may be desirable, especially for elderly patients, patients suffering from memory loss or other neurological complications, or the like. Embodiments disclosed herein provide container dispensing systems that may help users keep track of when a medication, vitamin, or other dosage-based consumable was last taken or should next be taken in a simple non-digital form, directly from the bottle/vial in which the medication or vitamins are stored. The medicine or vitamin may be provided initially in a dispensing system as disclosed herein, or may be transferred to a dispensing system as disclosed herein after being received in a conventional medicine bottle from a doctor, pharmacy, drug or grocery store, or the like.

Embodiments disclosed herein not only provides typical storage of medications and vitamins but also may aid users in staying compliant on taking their medication, by providing a mechanical method as part of the closure and/or cap to indicate when the user has dispensed a medication or vitamin from the bottle/vial every day of the week. In some embodiments, a dispensing system as disclosed herein also may indicate a time of day (for example, AM or PM) when the medication or vitamin was dispensed via one or more time-of-day indicators. For example, the AM/PM indication may correspond to any day of the week, which thereby communicates to the user an important feature for a twice a day dosage. Other divisions of a day may be used, such as morning/midday/afternoon/evening, breakfast/lunch/dinner, early/late, or the like, each of which may be indicated by a time-of-day indicator as shown.

Figure 1:
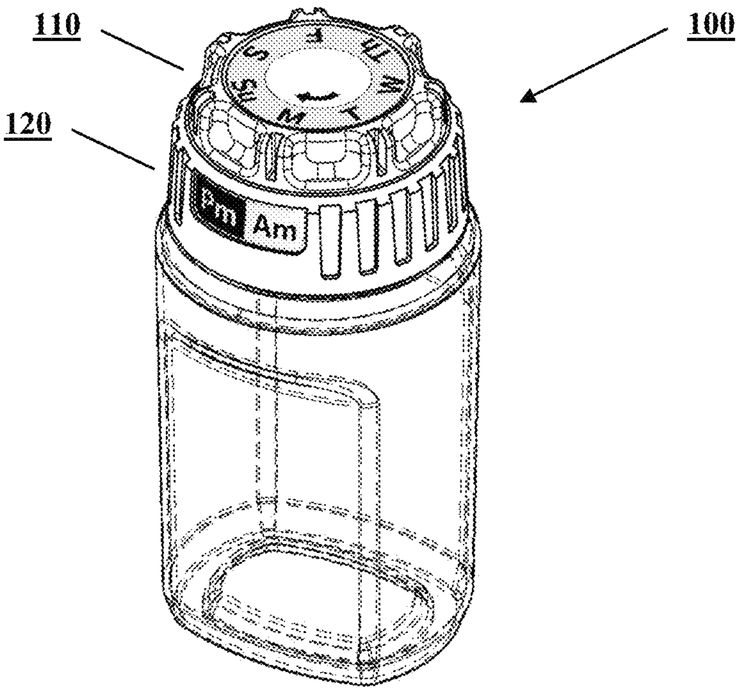
FIG. 1 shows an example of a dispensing system cap as disclosed herein attached to a standard medicine bottle.
Figure 2:
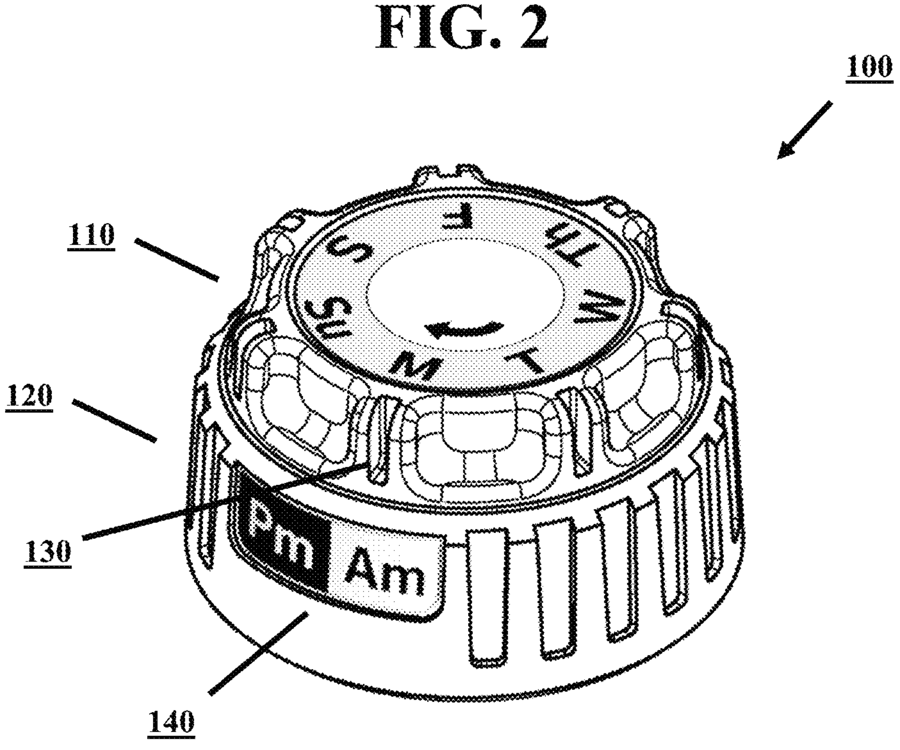
FIG. 2 shows a detail view of the cap shown in FIG. 1.

FIG. 1 shows an example embodiment of a dispensing system cap 100 as disclosed herein, arranged on a matching medicine bottle. As disclosed in further detail below, embodiments disclosed herein also may be used in conjunction with any conventional medicine bottle. FIG. 2 shows a detail view of the cap 100 alone.

Embodiments disclosed herein may include and/or be used on any standard type of bottle or vial. The system cap includes a main cap 120 and a top rotating dial 110. Notably, the same top 110 may be used with a variety of designs and arrangements of the main cap 120. For example, the main cap 120 may be fabricated in a variety of sizes to fit a range of standard medicine bottles, while the same rotating dial 110 may be used regardless of exterior design or features of the main cap 120. The container dispensing system cap may be used with most or all existing or proprietary bottle/vials in the current market, including standardized medicine bottles typically used by pharmacies and doctors to provide medications and other similar items to patients. In some embodiments, the exterior design as well as internal mechanical locking features may vary according to the type of bottle vial to be used, as disclosed in further detail below.

In some embodiments, the dispensing cap 100 may include a maximum of three components, depending on the type of bottle/vial to be used, as described in further detail below.

The top dial 110 may be used to indicate to the user when he or she has dispensed a medication or vitamin from the container. For example, the user may rotate the top dial 110 to indicate a specific day of the week and time of the day by aligning the front notch indicator 130 on the outer perimeter of the dial lines up with one of the time-of-day indicators 140, in this example AM/PM indicators.

The time-of-day indicator 140 may indicate the time of day corresponding to any day of the week aligned on the top dial 110. The indicator may be used to communicate to the user a number of doses per day. For example, the AM/PM indicator shown in FIG. 2 indicates a twice a day dosage. The user may turn the top dial 110 before or after he or she has dispensed the medication or vitamin from the bottle/vial, thereby indicating either when the next dose is due to be taken or when the previous dose was taken.

Figure 3A:
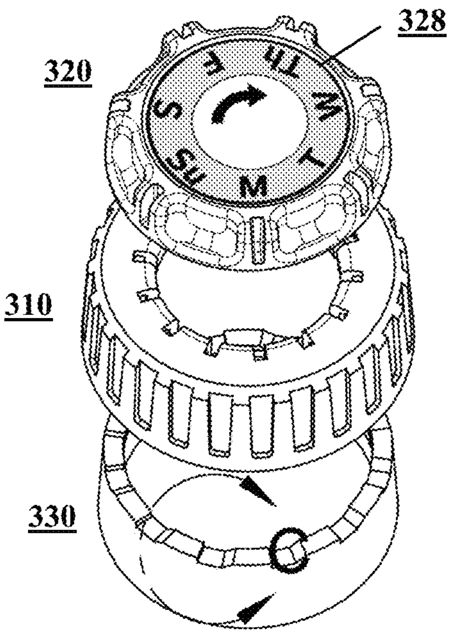
FIG. 3A shows an exploded top perspective view of a dispensing system cap as disclosed herein.
Figure 3B:
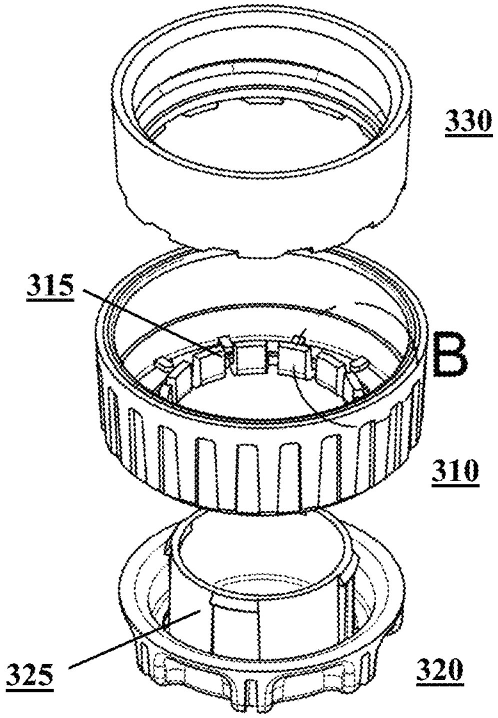
FIG. 3B shows an exploded bottom perspective view of a dispensing system cap as disclosed herein.
Figure 3C:
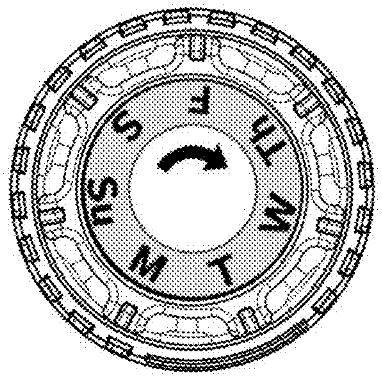
FIG. 3C shows a top view of the dispensing system cap shown in FIGS. 3A and 3B.
Figure 3D:
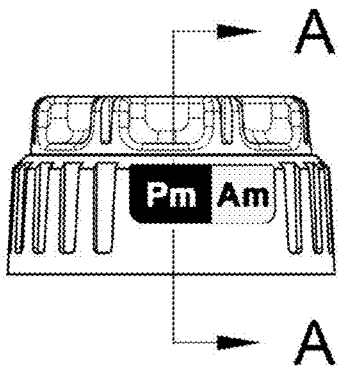
FIG. 3D shows a side view of the dispensing system cap shown in FIGS. 3A and 3B.
Figure 3E:
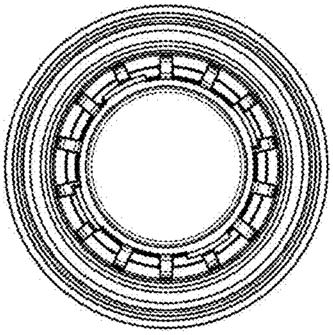
FIG. 3E shows a bottom view of the dispensing system cap shown in FIGS. 3A and 3B.
Figure 3F:
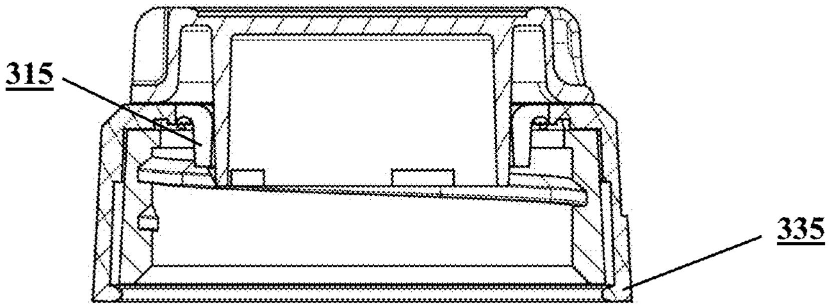
FIG. 3F shows a side cut-away view of the dispensing system cap shown in FIGS. 3A and 3B taken along line A-A in FIG. 3D.
Figure 3G:
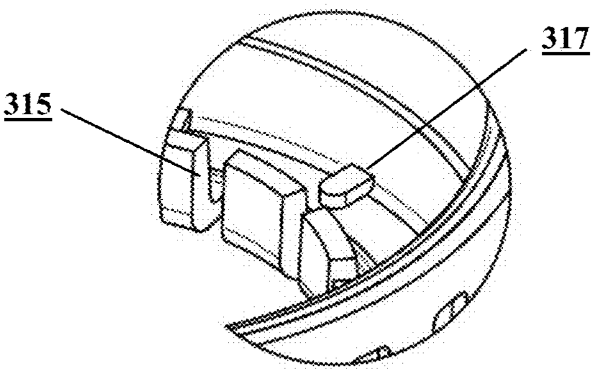
FIG. 3G shows a detail view of region B shown in FIG. 3B.
Figure 3H:
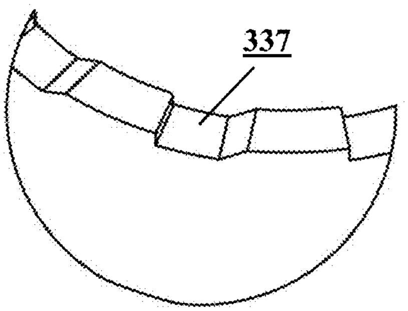
FIG. 3H shows a detail view of region C shown in FIG. 3A.

FIG. 3A shows an exploded top view of an embodiment of a dispensing system cap as shown in FIGS. 1-2. FIG. 3B shows a bottom exploded view of the same cap as in FIG. 3A. Such an embodiment may be used to provide child-resistant locking features. FIGS. 3C-3E show assembled top, side, and bottom views of the cap, respectively. The cap includes a bottom cap 310, a rotating dial 320, and an inner rotating part 330. FIG. 3F shows a side cross-sectional view along line A-A in FIG. 3C. FIG. 3G shows an enlarged detail view of area B in FIG. 3A. FIG. 3H shows an enlarged detail view of area C in FIG. 3A.

Notable in this type of mechanical assembly is the integration of the rotating indexing dial 320. The dial 320 assembles through the top of the bottom cap 310 and snaps in place via snap features 325 located around the perimeter of the dial 320 and engaging the flexible standing detents 315 as shown on detail B and section A-A in FIG. 3F.

The bottom cap 310 may have an approximate outside diameter of about 45 mm. It may include, for example, 14 detent features 315 along the inside circumference, though other numbers of detents may be used. The detents 315 may be contained in an approximate diameter of about 24-26 mm and may serve as stops or clicks as the top dial 320 is rotated to each day of the week and any of the 14 possible positions on the inner circumference. As used herein with regard to a rotatable dial, a "stop" refers to a point at which the rotation requires more force to move past during the rotation than the majority of the rotation of the dial. For example, the dial may require an initial amount of force to move when not positioned at a stop. Exerting the same amount of force will cause the dial to continue rotational movement until it reaches a "stop." Exerting the same amount of force will not move the dial past the stop; rather, a higher amount of force is applied to move past the stop, after which the first, lower, amount of force be applied to continue the rotational movement until the next stop is encountered.

As the dial 320 is rotated through each day of the week, it also indicates the corresponding AM or PM time of day for each day as previously disclosed and as shown in FIGS. 1-3. The cap 310 may include the time-of-day graphics or other indicators on the front face of the exterior perimeter as shown.

The detent features 315 in the cap 310 make it possible for the user to index the dial 320 to the correct location of each day of the week indicated on the day-of-week indicator 328 and at the same time indicate the time-of-day (in this example, AM or PM) accurately and precisely. The dial 320 may require a minimal rotational torque to be rotated to each position. Once the dial 320 is rotated to any position it remain in place by way of the stops as previously disclosed, until the user applies a minimal rotational torque to move the dial to the next position.

In this example, 14 detents may be used to correspond to 2 times of the day (AM/PM) and 7 days of the week. More generally, an appropriate number of detents may be used to provide stops corresponding to each time-of-day for each day as shown on the time-of-day indicators and the day indicators. For example, if only one dosage per day is desired to be indicated, only 7 detents may be used. Similarly, for three time-of-day indicators, 21 detents may be used.

The inner rotating part 330 may be inserted into the bottom of the bottom cap 310 and captured via a snap feature 335 located on the inside of the bottom cap 310. Once the inner rotating part 330 is assembled in place, it can rotate freely inside the bottom cap 310. After the completed assembly is fully screwed onto a bottle/vial as shown in FIG. 1, for the user to unscrew the assembly the user must overcome the child proof features by pushing down on the exterior of the bottom cap 310 with some force and at the same time turn the bottom cap 310 counterclockwise. This will engage the 12 mechanical features 317 around the inside perimeter of the bottom cap 310 with the inside detents 337 at the bottom of the inner rotating part 330 shown on detail C and in FIG. 3G. If the user does not apply a downward force while rotating the bottom cap 310 in a counterclockwise direction, the mechanical features 317 will skip over the detents 337 and not unlock the assembly cap from the bottle. Accordingly, the interaction of the bottom cap 310 and the inner rotating part 330 may provide child-resistance or child-proof features to the cap design. Similar arrangements may be used for other child-resistant caps, such as for household chemicals including window washer fluid and the like, and other applications. In contrast to conventional caps used for such purposes, embodiments disclosed herein use a ring having an open center, such as the inner rotating part 330, rather than a closed cap as used in conventional arrangements.

Figure 4A:
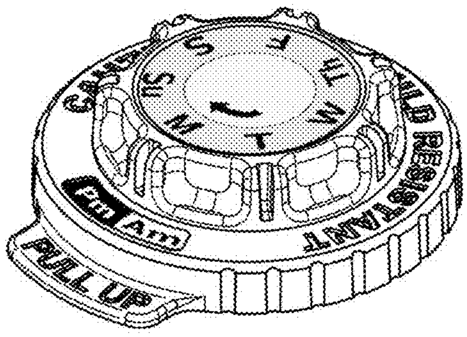
FIG. 4A shows a perspective view of a dispensing system cap as disclosed herein.
Figure 4B:
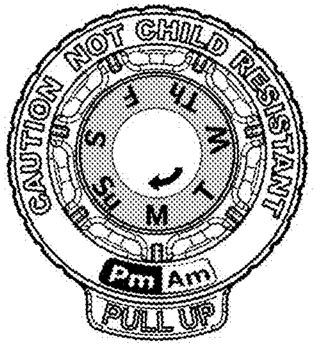
FIG. 4B shows a top view of the dispensing system cap shown in FIG. 4A.
Figure 4C:
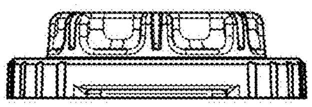
FIG. 4C shows a side view of the dispensing system cap shown in FIG. 4A.
Figure 4D:
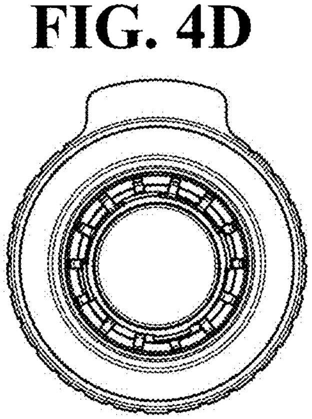
FIG. 4D shows a bottom view of the dispensing system cap shown in FIG. 4A.
Figure 4E:
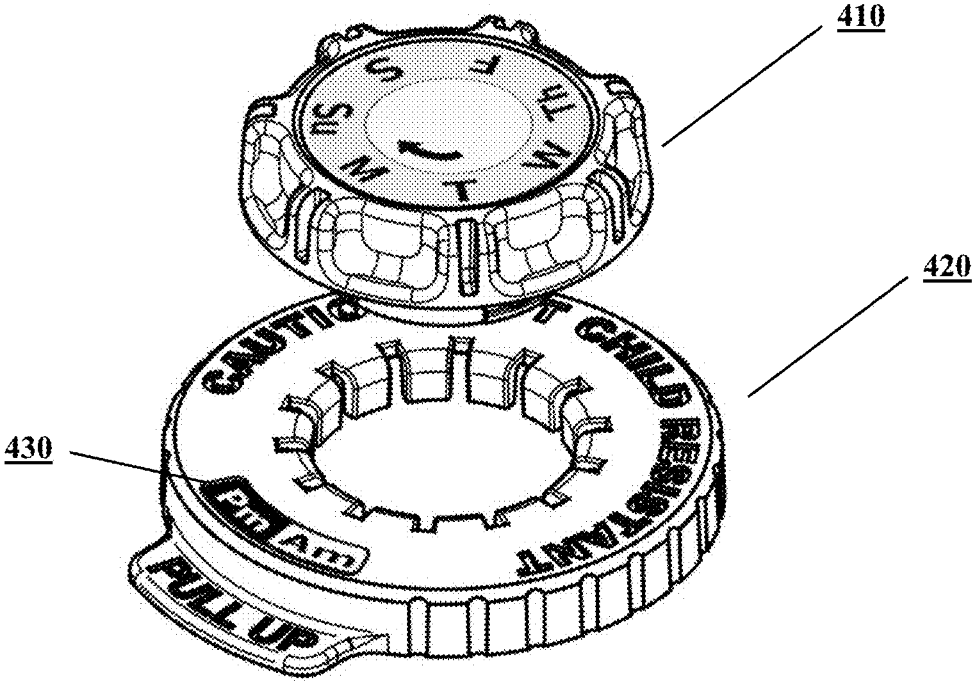
FIG. 4E shows an exploded top perspective view of the dispensing system cap shown in FIG. 4A.
Figure 4F:
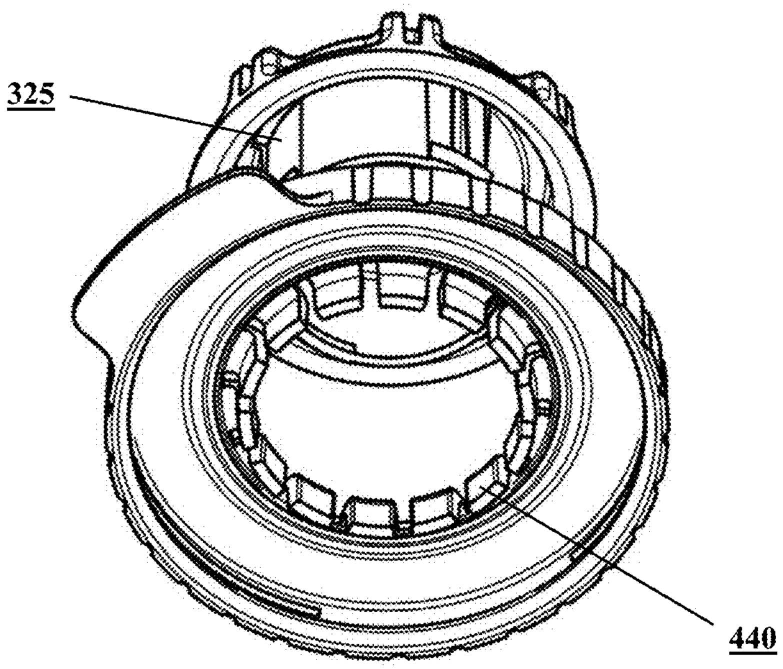
FIG. 4F shows an exploded bottom perspective view of the dispensing system cap shown in FIG. 4A.

In some embodiments, the child-resistant features may not be necessary or desired. For example, the mechanical features 317 and detents 337 may be omitted or modified to prevent the locking mechanism and associated force required to unscrew the cap as previously disclosed. Alternatively, the same rotating dial 320 may be used with a different bottom cap portion that does not include a locking mechanism. FIG. 4 shows an embodiment that includes a rotating dial and snap-on bottom portion. FIG. 4A shows a perspective view of the cap including a rotating dial 410, which may be identical to the dials 110, 320 as previously disclosed, and bottom snap-on cap 420. FIGS. 4B, 4C, and 4D show top, side, and bottom views of the cap shown in FIG. 4A, respectively. FIGS. 4E and 4F show top and bottom exploded views of the cap shown in FIG. 4A, respectively.

In a cap as shown in FIG. 4, the rotating dial 410 assembles through the top of the bottom cap 420 and snaps in place via the 4 snap features 325 located around the perimeter of the dial 410, as previously described with respect to FIG. 3B. The snap features 325 engage the flexible standing detents 440 in the same manner as previously described with respect to shown detail B and section A-A in FIGS. 3A-3H.

The bottom cap 420 may have, for example, an approximate outside diameter of 52 mm and may contains 14 detent features along the inside circumference as previously disclosed. Similar to the arrangement shown in FIG. 3, the detent features may be contained in an approximate diameter of 24-26 mm and they may serve as stops or clicks as the top dial 410 is rotated to each day of the week and any of the 14 possible positions on the inner circumference. As the top dial 410 is rotated through each day of the week, it also may indicate a corresponding time of day (e.g., AM or PM) for each day, in the same fashion as previously disclosed with respect to FIG. 3.

The bottom cap 420 may be sized and configured to fit on snap bottle/vial sizes ranging from 8-80 Dram (DR), including 20 DR to 60 DR, or vitamin bottle sizes and similar bottles having volumes from 60 to 800 cc. More generally, embodiments disclosed herein may be used with any size medicine, vitamin, or equivalent dispensing bottle, though the uses of such bottles are not limited to these examples. The bottom cap 420 in this arrangement, although different in size and exterior shape, may include the same 14 build-in detent features as in the arrangement shown in FIG. 3 and as previously disclosed. The bottom cap also may include the time-of-day indicators 430 on the upper surface, as shown in FIGS. 4A and 4E.

Figure 5A:
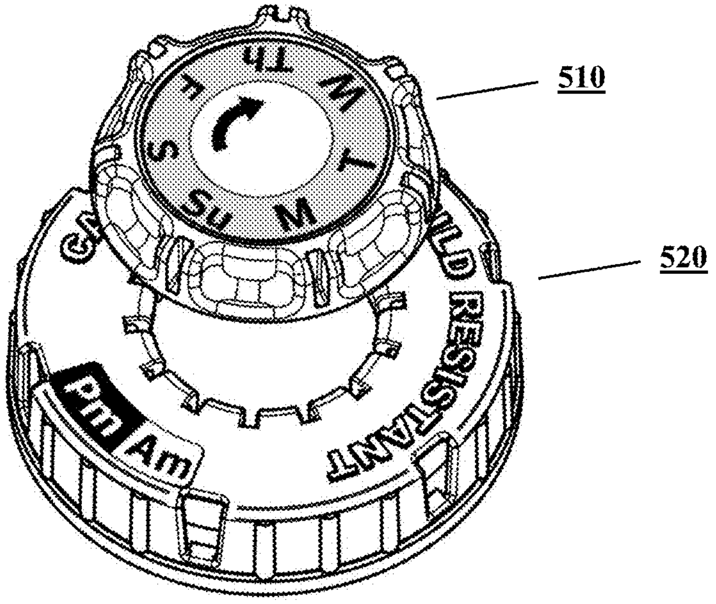
FIG. 5A shows an exploded top perspective view of a dispensing system cap as disclosed herein.
Figure 5B:
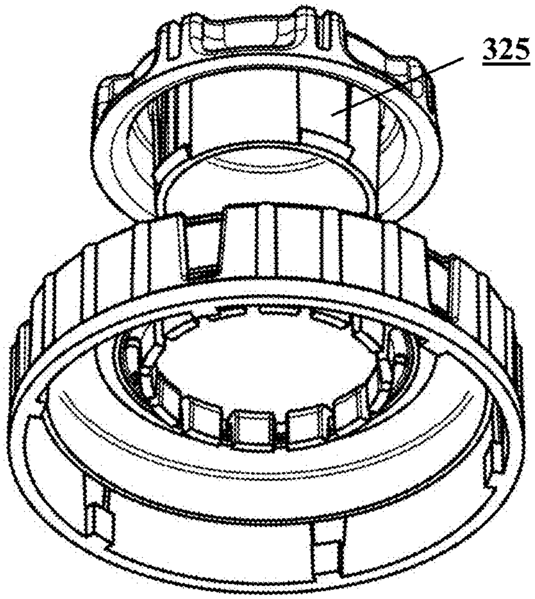
FIG. 5B shows an exploded bottom perspective view of the dispensing system cap shown in FIG. 5A.
Figure 5C:
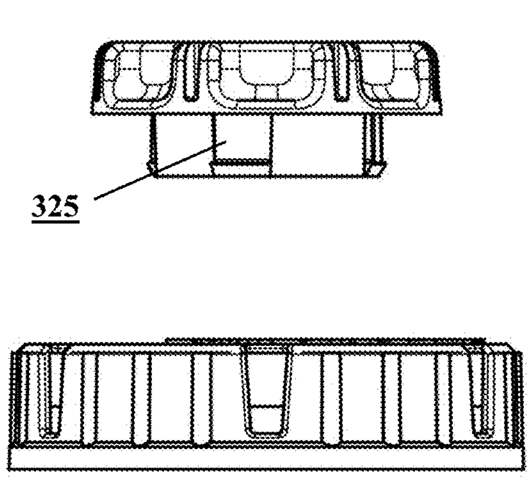
FIG. 5C shows an exploded side view of the dispensing system cap shown in FIG. 5A.
Figure 5D:
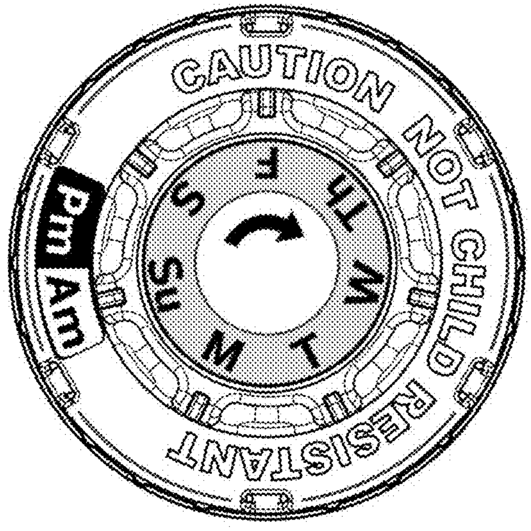
FIG. 5D shows a top view of the dispensing system cap shown in FIG. 5A.
Figure 5E:
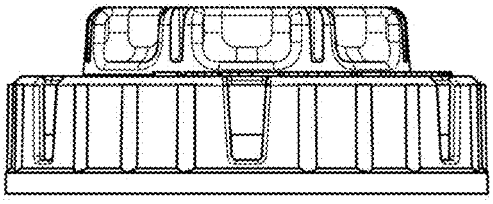
FIG. 5E shows a side view of the dispensing system cap shown in FIG. 5A.
Figure 5F:
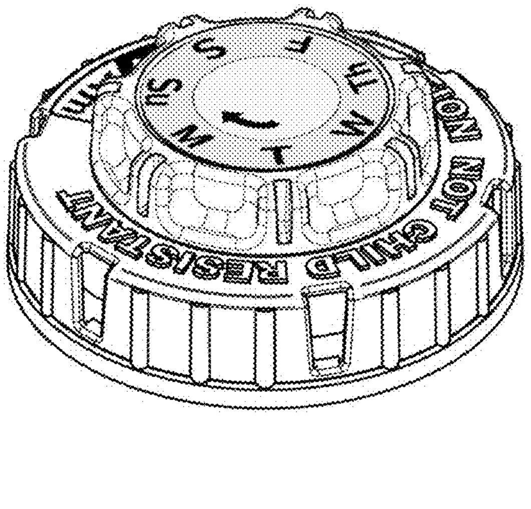
FIG. 5F shows a perspective top view of the dispensing system cap shown in FIG. 5A.
Figure 5G:
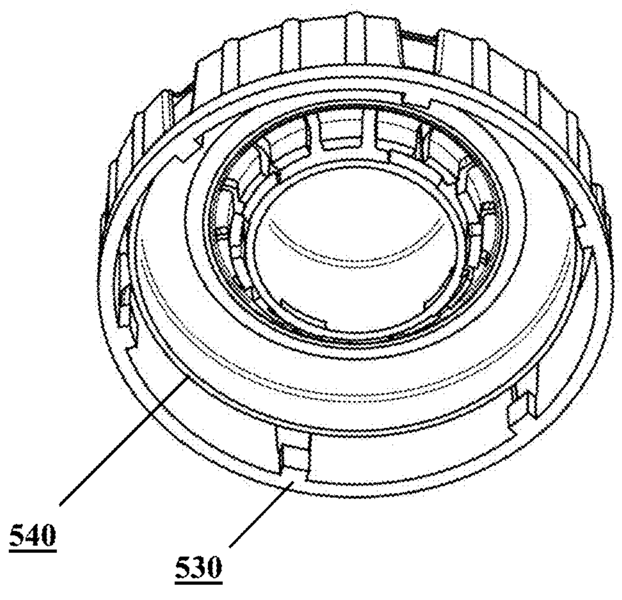
FIG. 5G shows a perspective top view of the dispensing system cap shown in FIG. 5A.

In another embodiment, a rotating dial as previously disclosed may be incorporated with a base configured to attach to a medicine bottle having a standardized "push-down-and-turn" arrangement, such as those disclosed in U.S. Pat. Nos. 5,938,055 and 5,449,078. FIG. 5 shows an example of such an embodiment. FIGS. 5A, 5B, and 5C show exploded top perspective, bottom perspective, and side views, respectively. FIGS. 5D and 5E show top and side views, respectively, of the cap shown in FIGS. 5A-5C, and FIGS. 5F and 5G show top and bottom perspective views, respectively, of the assembled cap shown in FIGS. 5A-5C.

The arrangement shown in FIGS. 5A-5G includes a bottom cap 520 and a rotatable dial 510 that may be identical to the rotating dial 110, 320, 410, previously shown and described. The rotating dial 510 assembles through the top of the bottom cap 520 and snaps in place in the same manner as previously described for the rotating dial in FIGS. 1-4. The rotating dial 510 may snap in place via snap features disposed around the perimeter of the dial 510 as previously shown and described. As with the previously-described embodiments, the bottom cap 520 may have an approximate outside diameter of 56 mm and include detent features along the inside circumference in an approximate diameter of 24-26 mm, which may serve as stops or clicks as the dial 510 is rotated to each day of the week and any of the possible positions on the inner circumference to indicate a day of the week and time of day.

In this embodiment, the bottom cap 520 is sized and configured to fit on standard bottle/vial that accepts the six push down and turn mechanical features 530 shown along the inside perimeter. A rib 540, such as a flexible thin plastic rib may be dispose along the inside perimeter of the cap 520 to act as a spring which forces the user to exert a downward force as the cap is being rotated to engage the locking features 530 with the exterior locking features on the bottle/vial, for example as shown in FIG. 2 of U.S. Pat. No. 5,938,055. The cap 510 may be sized and configured to fit any size standard medicine or vitamin bottles as previously disclosed, including 8-80 DR and/or 60-800 cc or any intermediate size.

Figure 6A:
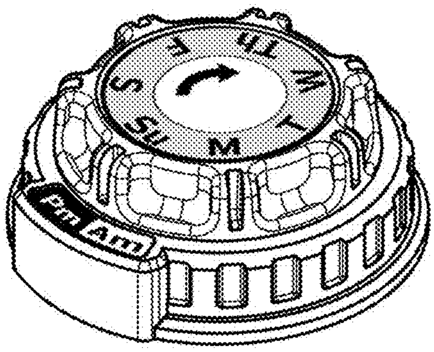
FIG. 6A shows a perspective view of an example of a dispensing system cap as disclosed herein.
Figure 6B:
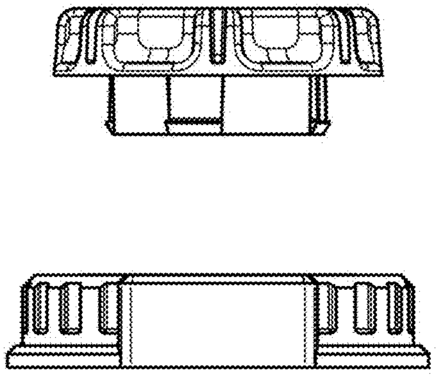
FIG. 6B shows an exploded side view of the dispensing system cap shown in FIG. 6A.
Figure 6C:
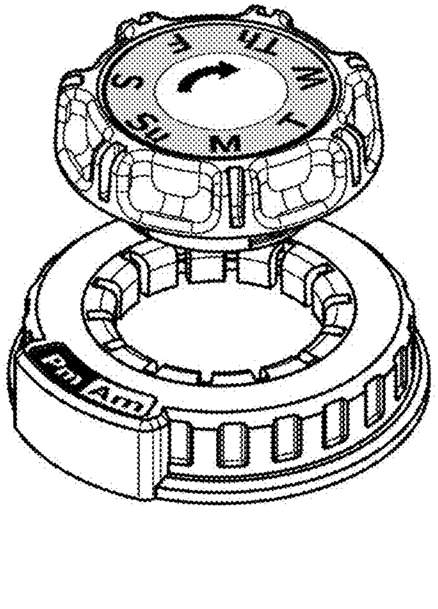
FIG. 6C shows an exploded top view of the dispensing system cap shown in FIG. 6A.
Figure 6D:
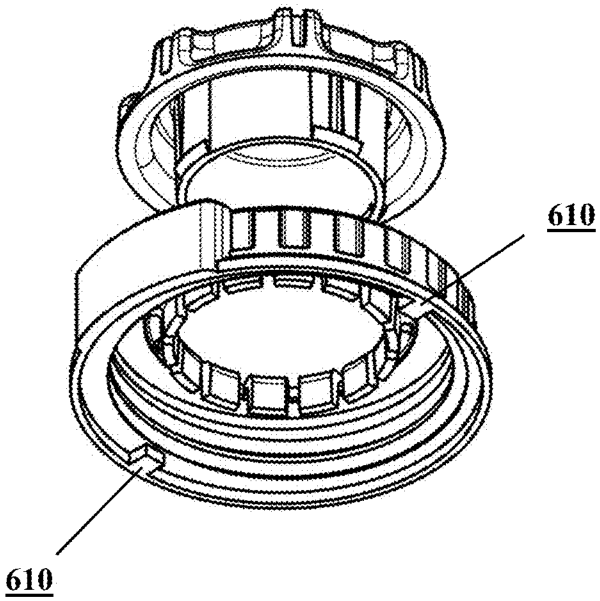
FIG. 6D shows an exploded bottom view of the dispensing system cap shown in FIG. 6A.
Figure 6E:
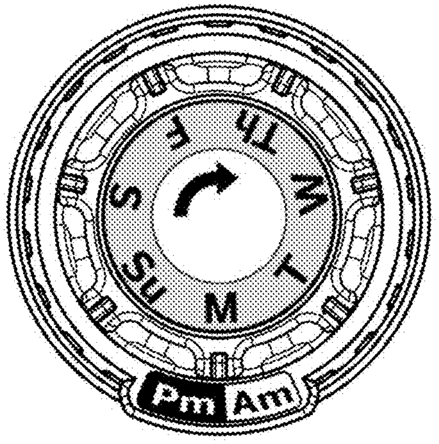
FIG. 6E shows a top view of the dispensing system cap shown in FIG. 6A.
Figure 6F:
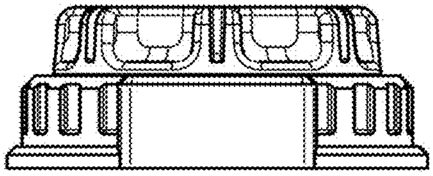
FIG. 6F shows a side view of the dispensing system cap shown in FIG. 6A.
Figure 6G:
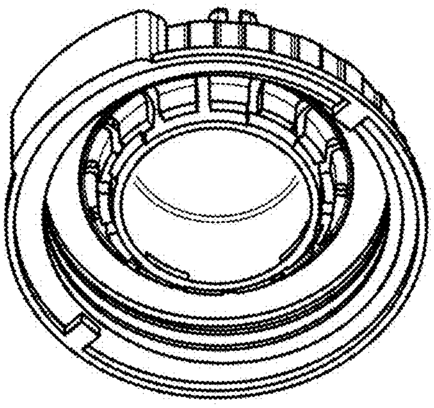
FIG. 6G shows a bottom perspective view of the dispensing system cap shown in FIG. 6A.

In another embodiment, a dispensing system cap as disclosed herein may include a rotatable dial as previously disclosed attached to a base sized and configured to attach to a bottle or vial that includes a side finger tab that provides child-resistant features. FIG. 6A shows a perspective view of such a cap. FIGS. 6B, 6C, and 6D show exploded side, top, and bottom perspective views, respectively. FIGS. 6E, 6F, and 6G show top, side, and bottom views of the same cap, respectively. FIG. 6D shows the lock features 610 that interlock with the top of the bottle when the user screws the cap to the bottle. The user must then push down on the front finger tab to allow the cap to be unscrewed from the bottle. Other than the mechanical features necessary to attach to the finger tab vial, the assembly, operation, dimensions, and features of the cap shown in FIGS. 6A-6G are identical to those previously described with respect to FIGS. 1-5. Notably, the rotatable dial may be identical to those previously described, including the attachment, locking, rotation stop, and other features.

FIG. 7 shows another embodiment that may use a different rotatable dial design. FIG. 7A shows a perspective view of the assembled cap; FIGS. 7A and 7C show side and top views, respectively, of the same cap as FIG. 7A; and FIGS. 7C and 7E show cut-away side views taken along lines A-A and B-B in FIGS. 7B and 7D, respectively. FIGS. 7F and 7G show exploded views of the three components of the cap shown in FIG. 7A. FIGS. 7H and 7I show cut-away side views of the main body and rotatable dial, respectively.

Figure 7A:
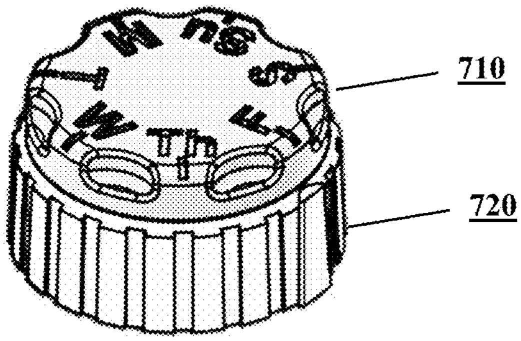
FIG. 7A shows a perspective view of an example of a dispensing system cap as disclosed herein.
Figure 7B:
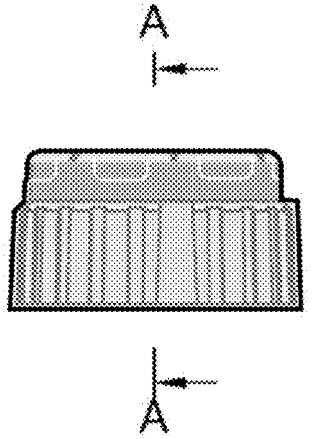
FIG. 7B shows a side view of the dispensing system cap shown in FIG. 7A.
Figure 7C:
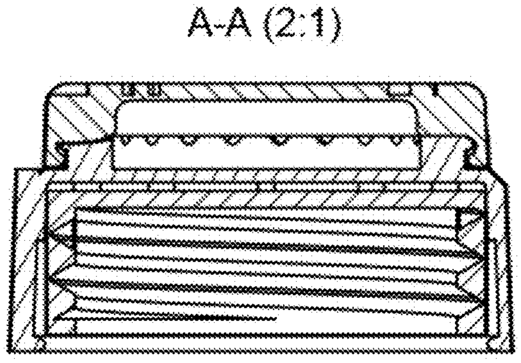
FIG. 7C shows a cut-away side view of the dispensing system cap shown in FIG. 7A taken across line A-A in FIG. 7B.
Figure 7D:
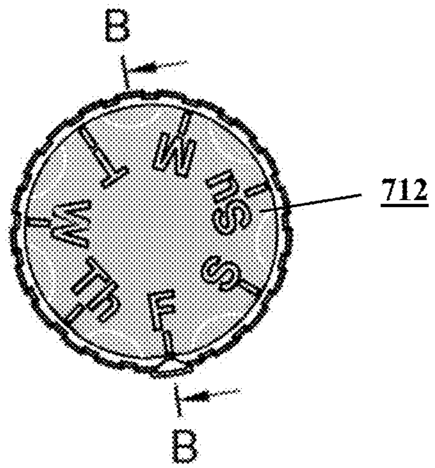
FIG. 7D shows a top view of the dispensing system cap shown in FIG. 7A.
Figure 7E:
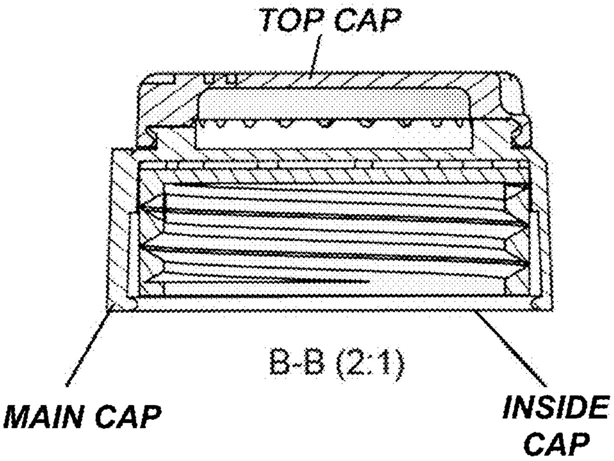
FIG. 7E shows a cut-away view of the dispensing system cap shown in FIG. 7A taken across line B-B in FIG. 7D.
Figure 7F:
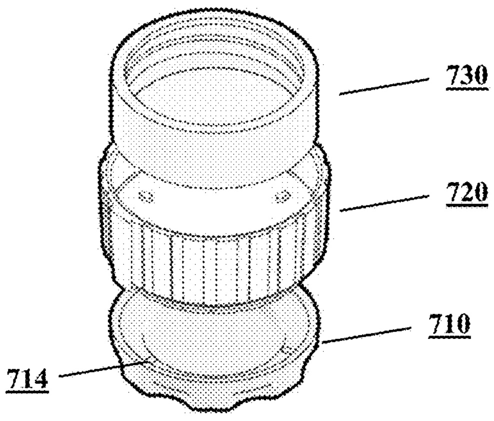
FIG. 7F shows an exploded bottom view of the dispensing system cap shown in FIG. 7A.
Figure 7G:
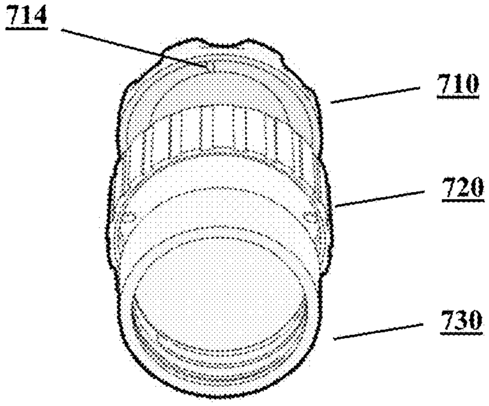
FIG. 7G shows an exploded bottom view of the dispensing system cap shown in FIG. 7A.

The cap includes a rotatable dial 710, a bottom cap 720, and an inner rotating part 730. In this embodiment, the rotatable dial 710 is integrated with the bottom cap portion 720. The rotatable dial 710 assembles on top of the main body 720 via a build-in snap feature, as shown in FIG. 7C. Similar to the previous rotatable dial, indicators for the days of the week 712 may be imprinted or otherwise shown on the top surface of the dial 710.

Figure 7H:
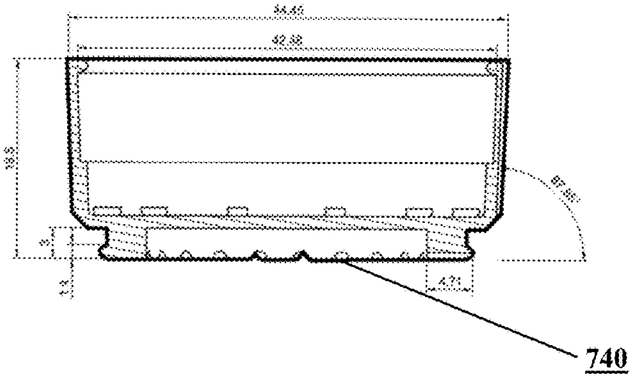
FIG. 7H shows a cut-away side view of the main body of the dispensing system cap shown in FIG. 7A.
Figure 7I:
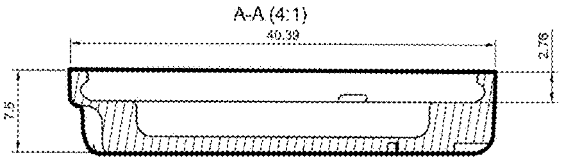
FIG. 7I shows a cut-away side view of the rotatable dial of the dispensing system cap shown in FIG. 7A.

Three or more molded-in raised ribs 714 may be disposed on the inside of the rotatable dial 710, which may be equally spaced on the circumference of the dial. These raised features interact with 21 recessed grooves 740 on top of the main body 720 as shown in FIG. 7H. After the rotatable dial 710 and the main body 720 are assembled, the inner rotating part 730 may be rotated. The snap features make it possible for the user to index the 710 to the correct location of each letter accurately and precisely. The indexing snap feature of the rotatable dial 710 also may provide the correct amount of torque so it can be set and stay in that location unless the user, when needed, applies the right amount of torque to rotate the dial 710 to a new location.

This embodiment also may include child-resistant or child-proof features integrated with the main body 720 and the inner rotating part 730, for example by using components equivalent to 317, 337 shown in FIGS. 3G and 3H. More generally, other than the specific differences shown and arranged, any of the features previously described with respect to FIGS. 1-6 may be incorporated into the embodiment shown in FIGS. 7A-7I, including appropriate dimensions, features, and configurations to allow the complete cap to be attached to any standard medicine bottle.

Notably, each embodiment disclosed herein may include a rotatable dial as shown and described, which may be rotatably connected to a main cap body. The main cap body may have various different dimensions and shapes as described while still allowing for connection of the rotatable dial. The main cap body may include the time-of-day indicators disposed either on an outer surface or an upper surface of the main cap body as shown and described in the various examples provided herein. A bottom cap assembly may be used, for example as shown and described with respect to FIGS. 3A-3H, for example to provide child-resistant or other locking features, or such features may be directly incorporated into the main cap body as previously described. Each component, device, and system disclosed herein may be fabricated of appropriate materials known in the art, including various plastics commonly used to fabricate medicine bottles and bottle caps, though the embodiments disclosed herein are not limited thereto. Unless explicitly indicated to the contrary or apparent due to the structure of individual devices, any feature disclosed herein with respect to one embodiment may be present in any other described embodiment, in any combination. Any feature of the rotatable dial described with respect to one embodiment similarly may be present in other embodiments.

The various embodiments, descriptions, and figures disclosed herein are provided by way of example only, and are not intended to limit the scope of the invention. Embodiments may include variations from the examples and embodiments described herein, as will be apparent to one of skill in the art.

What is claimed is:

1. A dispensing system cap device comprising:
- a main cap body;
- a rotatable dial rotatably coupled to the main cap body and comprising an upper dial portion and an axial portion extending perpendicularly away from a bottom area of the upper dial portion and passing through the main cap body, the rotatable dial comprising a plurality of day indicators, each of which indicates at least one day of the week; and
- one or more time-of-day indicators disposed on an outer surface of the main cap body, each of which indicates at least one time of day;
- wherein the rotatable dial comprises a plurality of stops, each corresponding to a combination of:
  - one of the day indicators; and
  - one of the time-of-day indicators.

2. The cap device of claim 1, wherein the rotatable dial comprises a plurality of notches, each of which aligns with one of the time-of-day indicators at one of the plurality of stops and each of which is aligned with one of the day indicators.

3. The cap device of claim 1, further comprising a locking mechanism that requires a downward force to rotate when the cap device is rotatably connected to a medicine bottle.

4. The cap device of claim 1, wherein the main cap body is configured to removably attach the cap device to a medicine bottle.

5. The cap device of claim 1, wherein the main cap body comprises a plurality of detents disposed on an interior portion of the main cap body, wherein each detent corresponds to one of the stops.

6. The cap device of claim 1, further comprising a bottom cap configured to removably attach to a medicine bottle and disposed within the main cap body, wherein the main cap body is rotatable around the bottom cap.

7. The cap device of claim 6, the bottom cap further comprising a locking mechanism that requires a downward force to rotate the bottom cap on the medicine bottle when the cap device is rotatably connected to the medicine bottle.

8. The cap device of claim 1, wherein the time-of-day indicators comprise two indicators.

9. The cap device of claim 1, wherein the plurality of day indicators comprise seven indicators, each corresponding to a day of the week.

10. The cap device of claim 1, wherein the cap is configured to removably attach to a standard medicine bottle of 8DR to 80DR in size.

11. The cap device of claim 10, wherein the cap is configured to removably attach to a standard medicine bottle of 30DR to 60DR in size.

12. A dispensing system cap system comprising:
- a main cap body;
- a rotatable dial rotatably coupled to the main cap body and comprising an upper dial portion and an axial portion extending perpendicularly away from a bottom area of the upper dial portion and passing through the main cap body, the rotatable dial comprising a plurality of day indicators, each of which indicates at least one day of the week; and
  - one or more time-of-day indicators disposed on an outer surface of the main cap body, each of which indicates at least one time of day;
- wherein the rotatable dial comprises a plurality of stops, each corresponding to a combination of:
  - one of the day indicators; and
  - one of the time-of-day indicators; and
- a plurality of cap bases, each cap base configured and arranged to removably connect to a different style of medicine bottle;
- wherein the rotatable dial is attachable to each of the plurality of cap bases such that, when attached, the axial portion of the rotatable dial extends through the main cap body.

13. The dispensing system cap system of claim 12, wherein the rotatable dial comprises a plurality of notches, each of which aligns with one of the time-of-day indicators at one of the plurality of stops and each of which is aligned with one of the day indicators.

14. The dispensing system cap system of claim 12, wherein each of the plurality of cap bases comprises a plurality of detents disposed on an interior portion, wherein each detent corresponds to one of the stops.

15. The dispensing system cap system of claim 12, wherein the time-of-day indicators comprise two indicators.

16. The dispensing system cap system of claim 12, wherein the plurality of day indicators comprise seven indicators, each corresponding to a day of the week.

17. The dispensing system cap system of claim 12, wherein at least one cap base of the plurality of cap bases is configured to removably attach to a standard medicine bottle of 8DR to 80DR in size.

18. The dispensing system cap system of claim 15, wherein the at least one cap base is configured to removably attach to a standard medicine bottle of 30DR to 60DR in size.

* * * * *